(12) United States Patent
Brandt et al.

(10) Patent No.: US 6,518,524 B1
(45) Date of Patent: Feb. 11, 2003

(54) MULTI-FUNCTION STALK SWITCH

(75) Inventors: Bruce B. Brandt, Madison, IN (US); James R. Risk, Jr., Milan, IN (US); Bruce S. Rigsby, Charlestown, IN (US); Curtis L. Lidikay, Hanover, IN (US); Cary D. Branstetter, Brookville, IN (US)

(73) Assignee: Grote Industries, Inc., Madison, IN (US)

( * ) Notice: Subject to any disclaimer, the term of this patent is extended or adjusted under 35 U.S.C. 154(b) by 0 days.

(21) Appl. No.: 09/714,367

(22) Filed: Nov. 16, 2000

Related U.S. Application Data

(60) Continuation-in-part of application No. 09/466,938, filed on Dec. 20, 1999, now abandoned, which is a division of application No. 09/130,333, filed on Aug. 6, 1998, now Pat. No. 6,020,563.

(51) Int. Cl.⁷ .............................................. H01H 35/02
(52) U.S. Cl. .................................. 200/61.54; 200/61.27
(58) Field of Search ................ 200/61.54, 61.27–61.38, 200/1 R, 18, 61.57, 11 R, 565; 340/425.5–475; 338/32

(56) References Cited

U.S. PATENT DOCUMENTS

| | | | |
|---|---|---|---|
| 4,419,546 A | | 12/1983 | Arthur |
| 4,723,057 A | | 2/1988 | Lane, Jr. |
| 5,003,132 A | | 3/1991 | Lagier |
| 5,047,600 A | | 9/1991 | Enari et al. |
| 5,075,519 A | | 12/1991 | Hayakawa |
| 5,107,243 A | * | 4/1992 | Maeda ........................ 338/172 |
| 5,153,391 A | * | 10/1992 | Dzung et al. ............. 200/11 R |
| 5,200,584 A | | 4/1993 | Nagaya |
| 5,272,290 A | | 12/1993 | Suzuki et al. |
| 5,430,265 A | | 7/1995 | Beattie et al. |
| 5,453,588 A | | 9/1995 | DuRocher et al. |
| 5,473,380 A | * | 12/1995 | DuRocher et al. ............ 29/622 |
| 5,473,809 A | | 12/1995 | DuRocher et al. |
| 5,581,058 A | * | 12/1996 | Javery et al. .................. 200/4 |
| 5,600,110 A | | 2/1997 | Neubauer |
| 5,610,378 A | | 3/1997 | DuRocher et al. |
| 5,691,519 A | | 11/1997 | Mahr |
| 5,742,014 A | | 4/1998 | Schwartz et al. |
| 5,747,763 A | | 5/1998 | Uchiyama et al. |
| 6,020,563 A | * | 2/2000 | Risk, Jr. et al. ......... 200/61.54 |

* cited by examiner

*Primary Examiner*—Lincoln Donovan
*Assistant Examiner*—Lisa N Klaus
(74) *Attorney, Agent, or Firm*—Woodard, Emhardt, Naughton, Moriarty & McNett

(57) ABSTRACT

A multi-function stalk switch that incorporates a pushbutton switch, a first rotary switch and a second rotary switch onto the end of a stalk, wherein further switching functions may be executed by moving the entire stalk in either of two orthogonal planes. The stalk switch incorporates many design features that enable it to be assembled at low cost from a small number of parts. One such feature is the use of plastic-on-plastic detents to control positioning of the rotary switches so that they wipe across predetermined portions of a flexible printed circuit board. Another feature is the inclusion of a springloaded plunger detent riding in a concave centering mechanism that is operable to automatically return the stalk switch to its central (neutral) position after removal of external biasing forces. A further feature is the inclusion of magnets on the stalk switch and Hall effect sensors fixedly mounted nearby in order to sense movement of the magnets (and therefore the stalk) in two orthogonal planes. Further features of the invention are also disclosed.

10 Claims, 10 Drawing Sheets

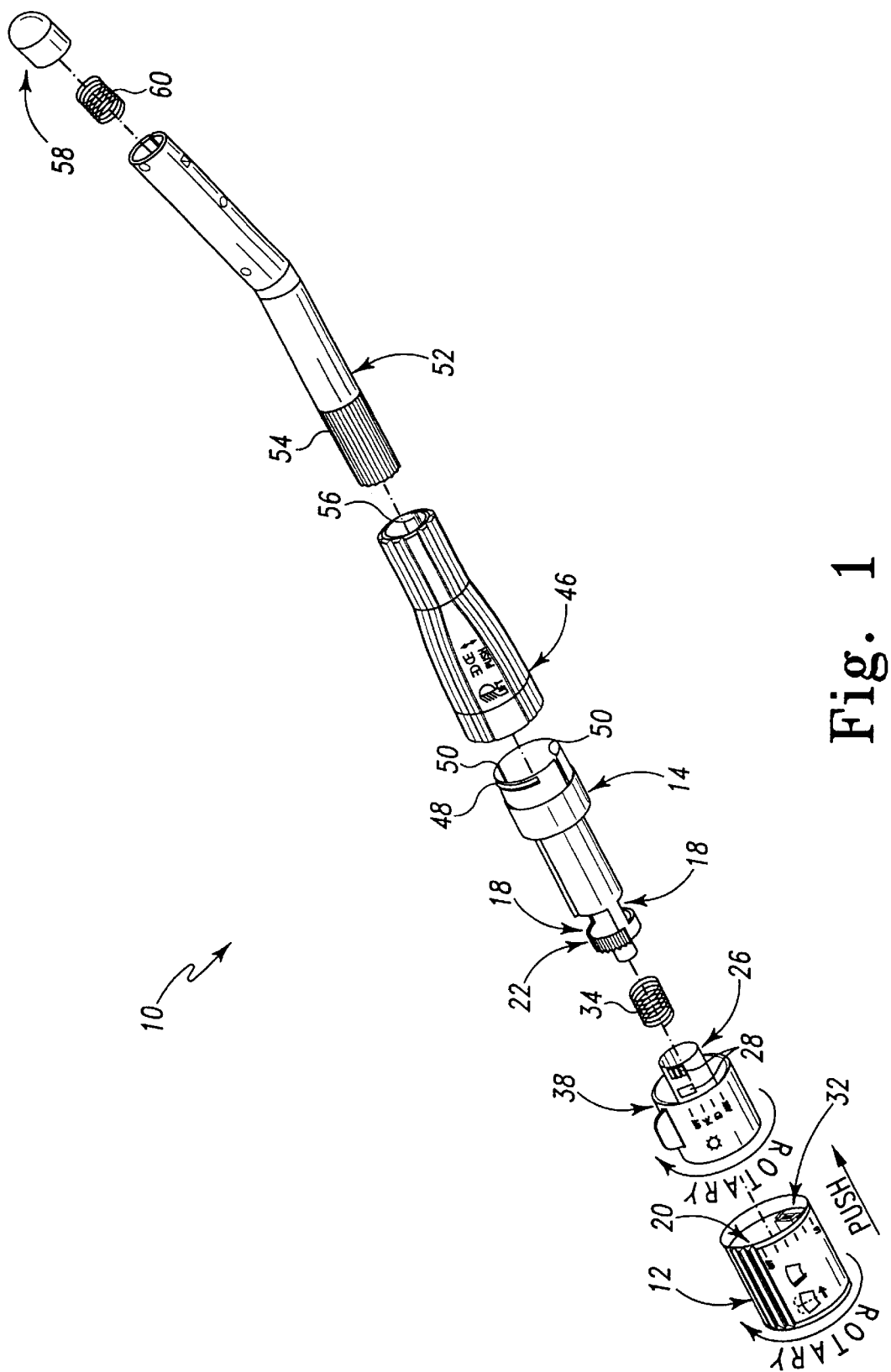

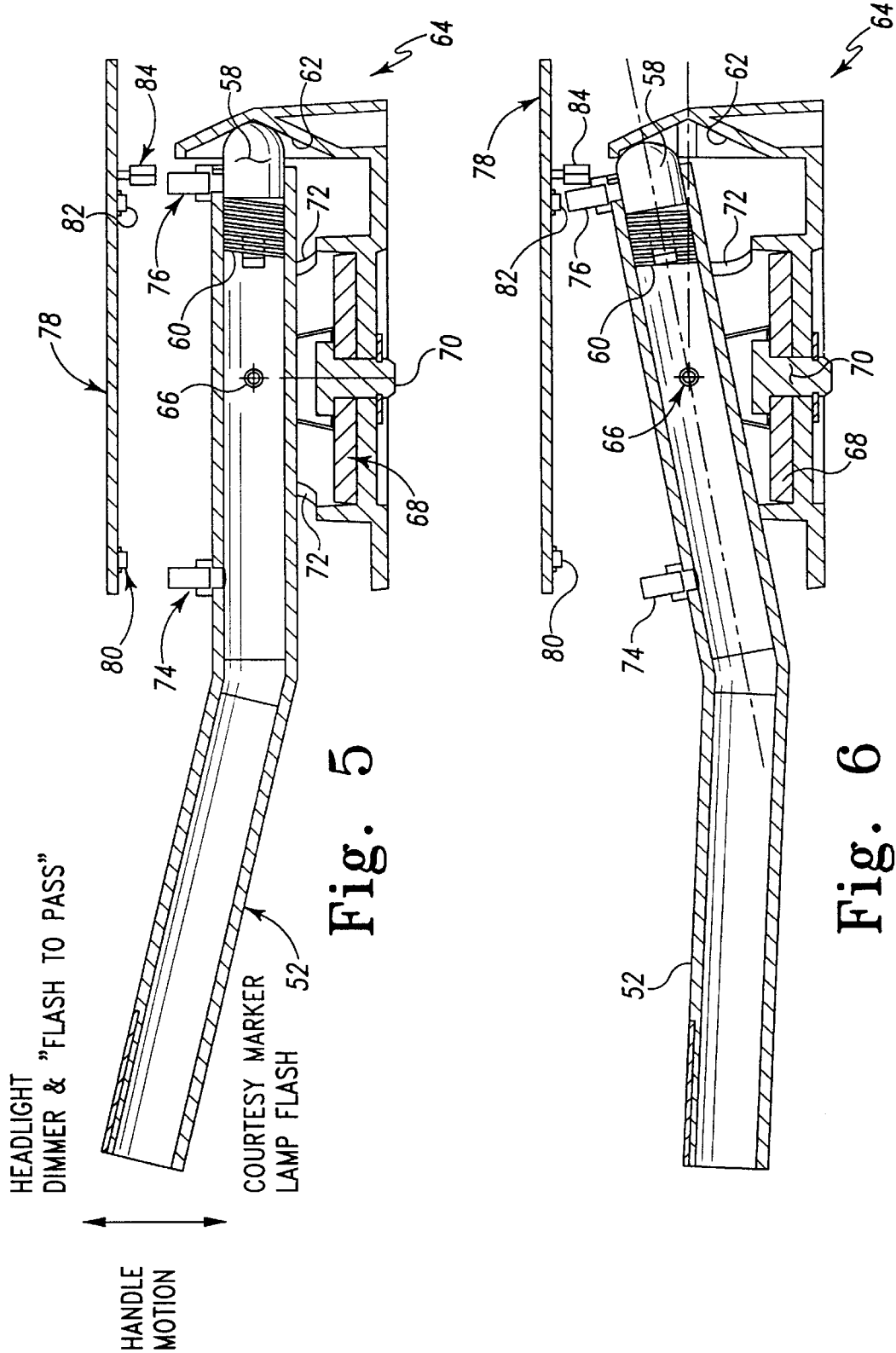

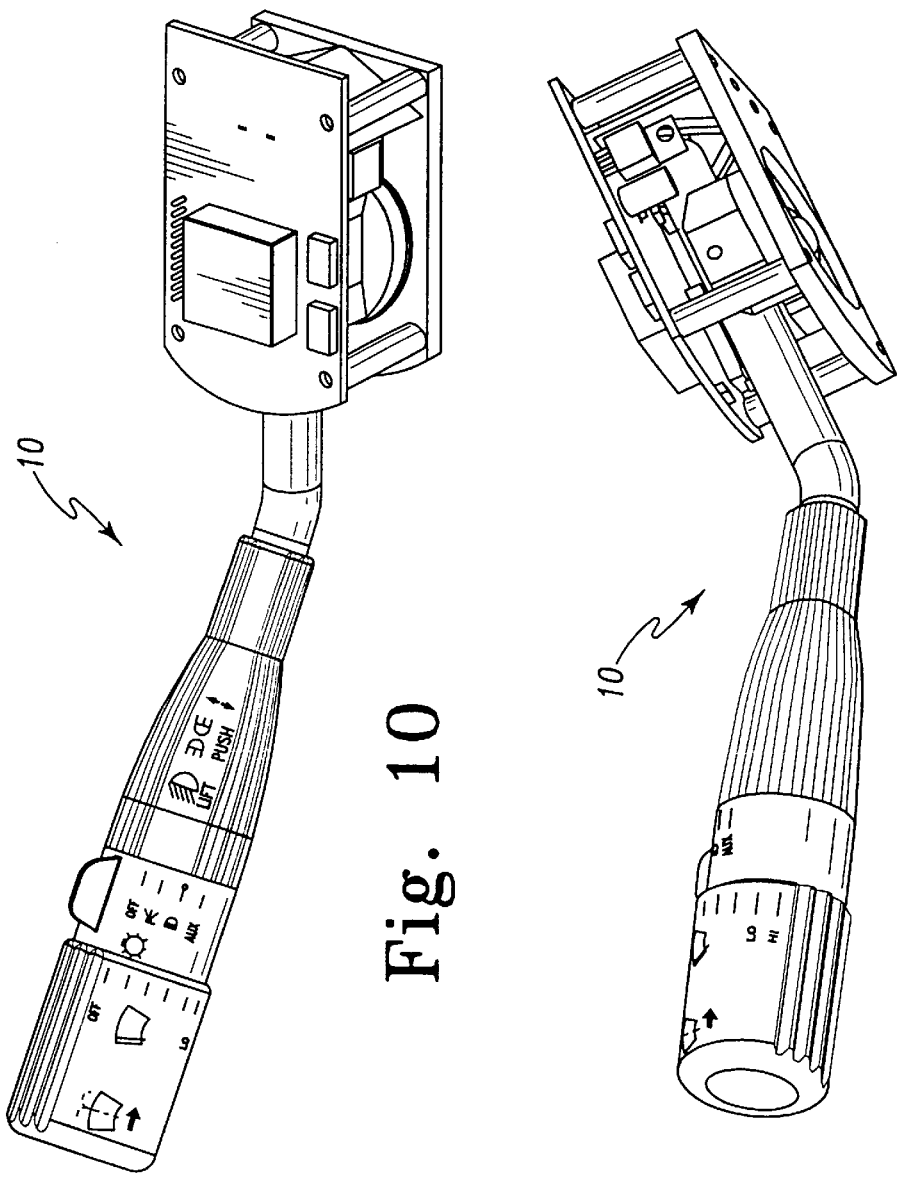

MULTI-FUNCTION STALK SWITCH

CROSS-REFERENCE TO PRIOR APPLICATIONS

The present application is a continuation-in-part under 35 U.S.C. §120 from U.S. application Ser. No. 09/466,938, filed Dec. 20, 1999 now abandon, which is a divisional application of 09/130,333, filed Aug. 6, 1998, now U.S. Pat. No. 6,020,563.

TECHNICAL FIELD OF THE INVENTION

The present invention generally relates to electrical switches and, more particularly, to a multi-function stalk switch.

BACKGROUND OF THE INVENTION

There is a need to provide a plurality of control switches that are easily accessible to a stationary operator in the field of motor vehicles, where it is desirable to place all of the controls frequently needed by an operator of the motor vehicle in such a position that they may be manipulated with a minimum of movement by the driver.

It is desirable to incorporate additional functionalities into the stalk switch traditionally used to activate the vehicle turn signals because of the stalk's close proximity to the vehicle steering wheel. However, designers have encountered various problems relating to complexity, cost and reliability as the number of integrated functions increase.

There is therefore a need for a stalk switch capable of activating a multiplicity of functions while maintaining low complexity from an assembly standpoint, low cost and/or high reliability. The present invention is directed toward meeting this need.

SUMMARY OF THE INVENTION

The present invention relates to one or more of the following: A multi-function stalk switch that incorporates a pushbutton switch, a first rotary switch and a second rotary switch onto the end of a stalk, wherein further switching functions may be executed by moving the entire stalk in either of two orthogonal planes. The stalk switch incorporates many design features that enable it to be assembled at low cost from a small number of parts. One such feature may include the use of plastic-on-plastic detents to control positioning of the rotary switches so that they wipe across predetermined portions of a flexible printed circuit board. Another feature may include the inclusion of a spring-loaded plunger detent riding in a concave centering mechanism that is operable to automatically return the stalk switch to its central (neutral) position after removal of external biasing forces. A further feature may include magnets on the stalk switch and Hall effect sensors fixedly mounted nearby in order to sense movement of the magnets (and therefore the stalk) in two orthogonal planes. Further features of the invention are also disclosed.

In one form of the invention, a multi-function switch is disclosed, comprising: a first rotary switch module having a first surface; at least one substantially incompressible first detent formed on said first surface; a rotary switch support member having a second surface; and at least one substantially incompressible second detent formed on said second surface; wherein said at least one first detent engages said at least one second detent; and wherein dimensions of said at least one first detent and said at least one second detent are such that said at least one first detent may be forced to override said at least one second detent when a first sufficient torquing force is applied to said first rotary switch module.

In another form of the invention, a multi-function switch is disclosed, comprising: a first rotary switch module having a first surface; a first conductive bridge contact coupled to said first surface; a rotary switch support member having a second surface; and a flexible circuit board in contact with and substantially conforming to at least a portion of—said second surface, said flexible circuit board having a plurality of exposed conductive contacts; wherein said first conductive bridge contact is operable to conductively couple at least two of said contacts when said first rotary switch module is at a first position with respect to said rotary switch support member.

In another form of the invention, a switch stalk is disclosed, comprising: a handle stalk having a proximal end and a distal end, said proximal end being operatively coupled to said rotary switch support member; a plunger coupled to said stalk distal end such that said plunger may move linearly with respect to said stalk distal end, said plunger being biased in said distal direction; a rotational receptacle coupled to said handle stalk such that said handle stalk may pivot in at least one plane; and a concave centering mechanism having a concave surface and coupled to said rotational receptacle such that said plunger is in contact with said concave surface; wherein a pivoting force applied to the handle stalk causes said plunger to be displaced along said concave surface, thereby compressing said plunger away from said distal end; and wherein removal of said pivoting force allows distal linear movement of said plunger in response to said plunger bias, thereby forcing said plunger to a center of said concave surface.

In another form of the invention, a multi-function switch is disclosed, comprising: a handle stalk having a proximal end and a distal end, said proximal end being operatively coupled to said rotary switch support member; a rotation assembly coupled to said handle stalk such that said handle stalk may be rotated with respect to said rotation assembly in at least one plane; at least one magnet coupled to said handle stalk; and at least one magnetic field sensor, wherein said at least one magnetic field sensor is positioned to sense movement of said at least one magnet when said handle stalk is rotated.

In another form of the invention, a multi-function switch is disclosed, comprising: a first rotary switch module having a first surface, a rotary switch support member having a second surface, at least one first detent formed on one of said first and second surfaces, a first detent washer shaped to engage said at least one first detent, and having an angular position fixed relative to one of the first rotary switch module and the rotary switch support member, and a first spring positioned to bias said first detent washer against said at least one first detent.

In another form of the invention, a multi-function switch is disclosed, comprising: a first rotary switch module having a first surface, a first magnet coupled to said first rotary switch module, a second rotary switch module having a third surface, a second magnet coupled to said second rotary switch module, a rotary switch support member having a second surface and a fourth surface, at least one first detent formed on one of said first and second surfaces, at least one second detent formed on one of said third and fourth surfaces, a first detent washer shaped to engage said at least one first detent and having an angular position fixed relative to one of the first rotary switch module and the rotary switch support member, a second detent washer shaped to engage said at least one second detent and having an angular position fixed relative to one of the second rotary switch module and the rotary switch support member. The stalk switch further comprises a first spring positioned to bias said first detent washer against said at least one first detent and a second spring positioned to bias said second detent washer against said at least one second detent. The multi-function stalk switch further comprises a flexible circuit board in contact with and substantially conforming to at least a portion of said second surface, said flexible circuit board having a first plurality of first magnetic field sensors, wherein said first magnet is positioned to be detected by at least one of said plurality of magnetic field sensors when said first rotary switch module is at a first position with respect to said rotary switch support member; and wherein said second magnet is positioned to be detected by at least one of said plurality of magnetic field sensors when said first rotary switch module is at a second position with respect to said rotary switch support member. The stalk switch further comprises a handle stalk having a proximal end and a distal end, said proximal end being operatively coupled to said rotary switch support member, and said distal end having a plunger coupled thereto such that said plunger may move linearly with respect to said stalk distal end, said plunger being biased in said distal direction, a rotation assembly coupled to said handle stalk by means of a first pivot pin extending therethrough, such that said handle stalk can rotate in a first plane, and by a second pivot pin, such that said handle stalk can rotate in a second plane, said second plane being substantially perpendicular to said first plane, a rotational receptacle coupled to said rotation assembly and having a first hole and a second hole, a concave centering mechanism having a concave surface and coupled to said rotational receptacle such that said plunger is in contact with said concave surface, wherein a pivoting force applied to the handle stalk causes said plunger to be displaced along said concave surface, thereby compressing said plunger away from said distal end, and wherein removal of said pivoting force allows distal linear movement of said plunger in response to said plunger bias, thereby forcing said plunger to a center of said concave surface. The stalk switch further comprises first and second plungers having respective first and second enlarged heads and being positioned substantially within said first hole and said second hole, respectively, a proximal third magnet substantially positioned within said first plunger and coupled to said handle stalk proximal of said first pivot pin, a distal third magnet coupled to said handle stalk distal to said first pivot pin positioned substantially within said second plunger, a fourth spring positioned around said first plunger between said first enlarged head and said rotation assembly, thereby biasing said first plunger away from said rotation assembly, a fifth spring positioned around said second plunger between said second enlarged head and said rotation assembly, thereby biasing said second plunger away from said rotation assembly, at least one second Hall effect sensor for sensing motion of said third magnets caused by rotation of said handle stalk about said first pivot pin, and at least one third Hall effect sensor for sensing rotation of said handle stalk about said second pivot pin.

BRIEF DESCRIPTION OF THE DRAWINGS

FIG. 1 is a first exploded perspective view of a preferred embodiment multi-function stalk switch of the present invention.

FIG. 5 is a partial cross-sectional view of the preferred embodiment of the present invention in a neutral position.

FIG. 6 is a partial cross-sectional view of the preferred embodiment of the present invention positioned to activate the courtesy marker lamp flash function.

FIGS. 10 and 11 are perspective views of the preferred embodiment of the present invention.

DETAILED DESCRIPTION OF THE PREFERRED EMBODIMENTS

Figure 3B:
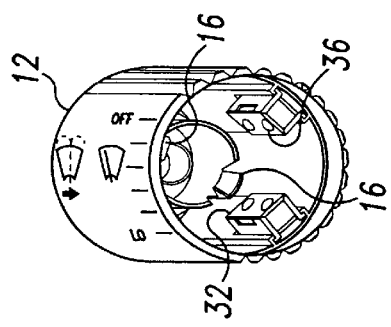
FIGS. 3A–B are perspective views of a first rotary switch module of the preferred embodiment of the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and method, and such further applications of the principles of the invention as illustrated therein being contemplated as would normally occur to one skilled in the art to which the invention relates.

The preferred embodiment of the present invention comprises a multi-function stalk switch which is adapted for use in a motor vehicle to control one or more of, and preferably all, of the windshield wipers, the windshield washer, the vehicle parking lights, the vehicle headlights, the vehicle auxiliary lights, the vehicle high-beam lights, the vehicle turn signals, a headlight dimmer a "flash-to-pass" function, and a courtesy marker lamp flash function, which functions are integrated into a single stalk switch which may be conveniently mounted to the vehicle steering column. Those having ordinary skill in the art, however, will appreciate from the following description that the stalk switch described herein, and the novel portions thereof, will find many applications beyond the application used to describe and illustrate the preferred embodiment. For example, the stalk switch of the present invention may be used in the motor vehicle setting to control other vehicle functions in various combinations, and also in the non-motor vehicle setting, to conveniently control a multiplicity of functions from a single position. Accordingly, the functions ascribed to the various switches in the preferred embodiment are to be considered as illustrative only, and are not intended to limit the apparatus described and claimed herein.

Figure 3A:
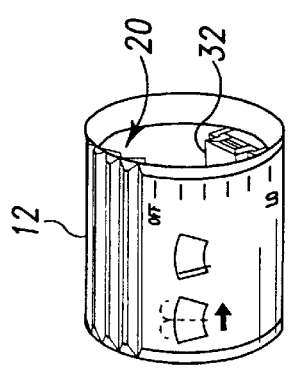
Figure 2:
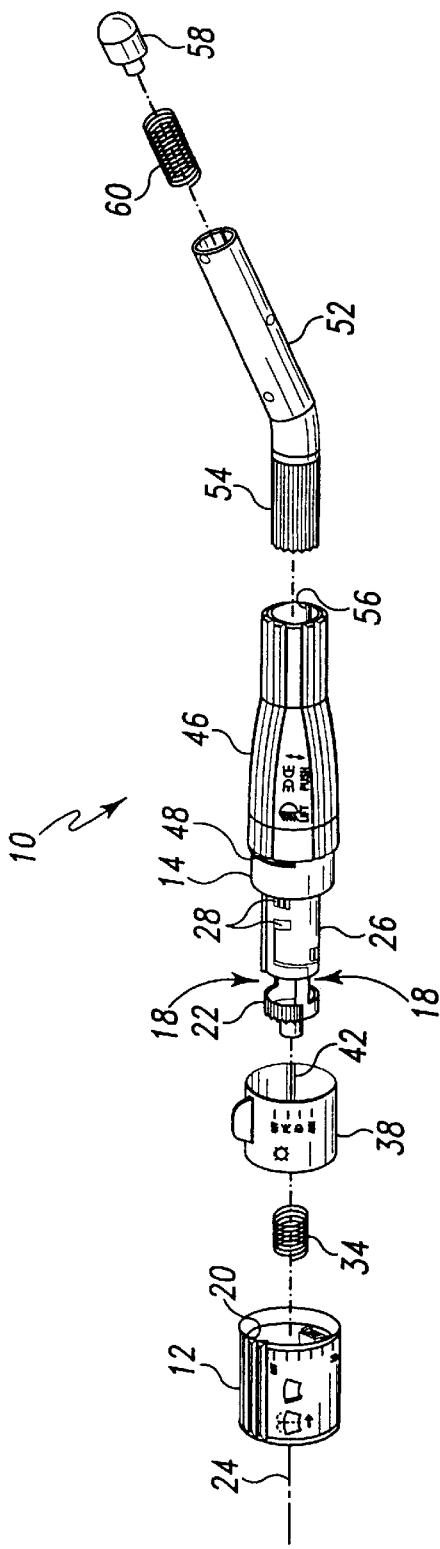
FIG. 2 is a second exploded perspective view of the preferred embodiment of the present invention.

A preferred embodiment of the present invention is illustrated in an exploded perspective view in both FIGS. 1 and 2, and indicated generally at 10. The views of FIGS. 1 and 2 are slightly different in order to more effectively illustrate the interrelationship between the various components in the exploded views. The stalk switch 10 includes a first rotary switch module 12, which is illustrated individually in FIGS. 3A–B. As described hereinbelow, the first rotary switch module 12 also incorporates a non-latching pushbutton function. In the preferred embodiment of the present invention, the first rotary switch module 12 is used to control the functioning of the motor vehicle windshield wipers and windshield washer. The first rotary switch module 12 ordinarily forms the proximal end of the stalk switch 10, the distal end of which is coupled to a rotational receptacle for mounting to the vehicle steering column (see FIGS. 8, 10, and 11).

The first rotary switch module 12 preferably mounts to a rotary switch support member 14 by means of a pair of flexible legs 16 (see FIG. 3B) that snap into a pair of mating receptacles 18 formed into the rotary switch support member 14. Because the arcuate width of each of the flexible legs 16 is less than the arcuate width of each of the mating receptacles 18, the mating between the legs 16 and receptacles 18 permits rotary motion of the first rotary switch module 12 with respect to the rotary switch support member 14 along a fixed arcuate length. Interaction between the legs 16 and the mating receptacles 18 provide end stops for this rotary motion.

Motion between the first rotary switch module 12 and the rotary switch support member 14 is further limited by a male detent 20 located on the inside surface of the first rotary switch module 12, which mates with a series of female detents 22 located on the rotary switch support member 14. Both the male detent 20 and the female detents 22 lie parallel to the longitudinal axis 24 of the stalk switch 10. Both the first rotary switch module 12 and the rotary switch support member 14, including male detent 20 and female detents 22, are preferably made from a substantially incompressible plastic material. The interaction between the male detent 20 and the female detents 22 is therefore plastic-on-plastic, and the detent dimensions are chosen such that the male detent 20 may be forced to override the partitions between the female detents 22 if a sufficient torquing force is applied to the first rotary switch module 12, even though none of the detents compress during this motion. A rotary torque applied to the first rotary switch module 12 will therefore cause the male detent 20 to sequentially snap into adjacent female detents 22 until the torquing force is removed or until the legs 16 interact with the edges of the mating receptacles 18.

The plastic-on-plastic detent mating thereby provides a limited range of motion to the first rotary switch module 12, as well as acting to secure the relative orientation of the first rotary switch module 12 with respect to the rotary switch support member 14 when the torquing force is removed from the first rotary switch module 12. The annular snap-fit plastic-to-plastic ratcheting detent system of the present invention represents a significant improvement over the traditional prior art spring-and-ball detent in the areas of cost, parts count, assembly time, and reliability.

Figure 9:
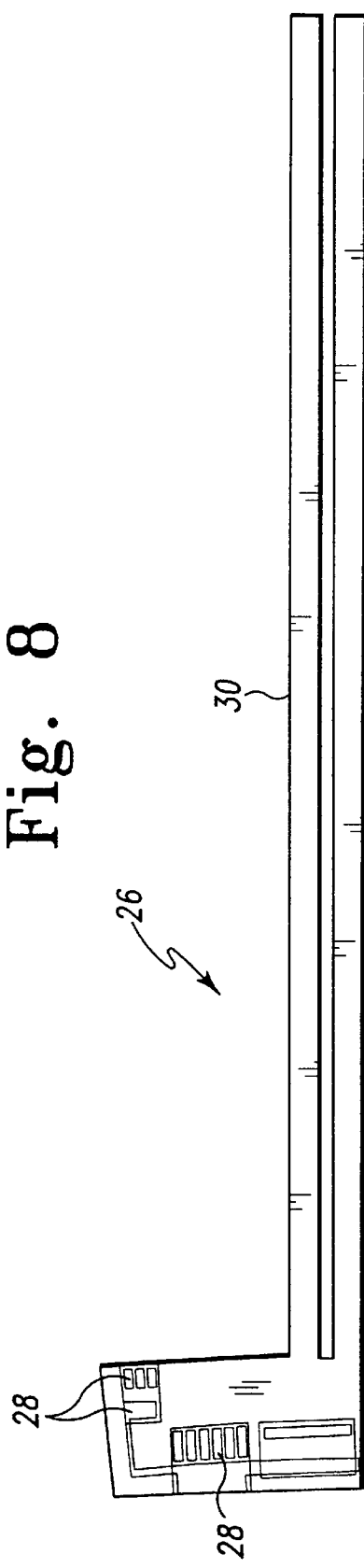
FIG. 9 is a plan view of a flexible circuit board of the preferred embodiment of the present invention.
Figure 12:
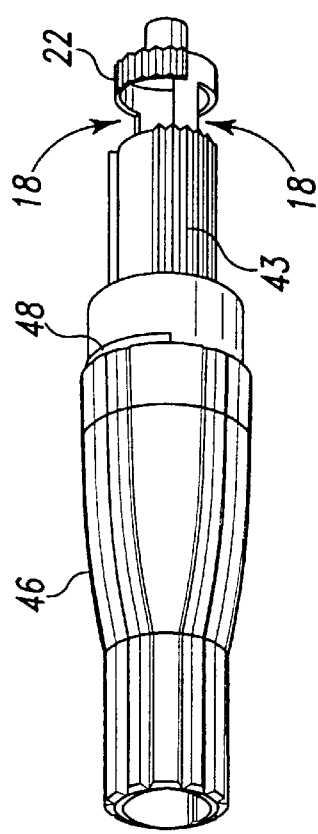
FIG. 12 is a perspective view of a back side of a stationary handle of the preferred embodiment of the present invention.
Figure 13:
FIG. 13 is a cross-sectional view of the flexible circuit board of FIG. 9.

In order for the first rotary switch module 12 to control activation of the motor vehicle windshield wipers with rotation of the switch module 12 with respect to the rotary switch support member 14, it is necessary that this rotary motion be made to cause, directly or indirectly, some closing of the electrical circuit as a result of its rotary movement. To this end, in the preferred version a flexible printed circuit board 26, having spaced-apart contacts 28 printed thereon, is wrapped around the main central portion of the rotary switch support member 14. The flexible printed circuit board 26 is illustrated in its unrolled state in FIG. 9, including the multi-lead connector portions 30 which extend to the distal end of the stalk for connection to the motor vehicle wiring harness. The flexible lead portions 30 are omitted from the drawings of FIGS. 1 and 2 for clarity of illustration of the remaining components found therein. In the preferred embodiment, the flexible printed circuit board 26 comprises copper-nickel conductor traces, sandwiched between two layers of 2 mil (0.002") polyamide film, wherein the conductor traces are, gold plated in regions where they are exposed, such as at the contacts 28. A first metallic bridge contact 32 located inside the first rotary switch module 12 is used to bridge various contacts 28 printed on the flexible circuit board 26 in order to control functioning of the motor vehicle windshield wipers, depending upon the position of the first rotary switch module 12 with respect to the rotary switch support member 14.

The first rotary switch module 12 preferably also controls functioning of the motor vehicle windshield washer, by changing the position of the first rotary switch module 12 on the longitudinal axis 24 with respect to the rotary switch support member 14. A spring 34 mounts between the first rotary switch module 12 and the rotary switch support member 14, in order to fix a resting separation between the two components; however, pushing on the proximal end of the first rotary switch module 12 is operative to compress the spring 34, thereby moving the first rotary switch module 12 closer to the rotary switch support member 14. This longitudinal movement causes a second metallic bridge contact 36 on the interior of the first rotary switch module 12 to bridge another pair of contacts 28 on the flexible circuit board 26, thereby causing activation of the motor vehicle windshield washer. Removal of the longitudinal force on the proximal end of the first rotary switch module 12 allows the spring 34 to return the first rotary switch module 12 to its original resting position, thereby moving the bridge contact 36 out of contact with the appropriate contacts 28 on the flexible circuit board. 26 and turning off the motor vehicle windshield washer. Longitudinal movement of the first rotary switch module 12 therefore can function as a non-latching pushbutton switch.

Figure 4B:
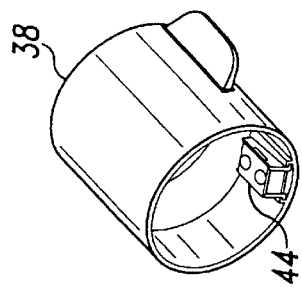
FIGS. 4A–B are perspective views of a second rotary switch module of the preferred embodiment of the present invention.
Figure 4A:
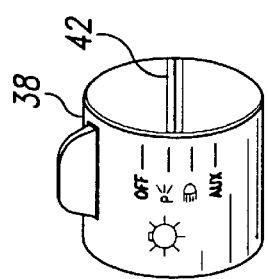

The multi-function stalk switch 10 of the present invention preferably further includes a second rotary switch module 38, which is separately illustrated in FIGS. 4A–B The second rotary switch module 38 is used in the preferred embodiment of the present invention to control the motor vehicle headlamps, parking lamps, and/or auxiliary lamps. The second rotary switch module 38 preferably also mounts to the rotary switch support member 14, distal to the mounting location of the first rotary switch module 12. In order to effect this mounting, the rotary switch support member 14 includes an annular groove (not shown) formed therein that extends over a partial circumference of the rotary switch support member 14. The second rotary switch module 38 includes a male annular ring located on the interior surface thereof which extends over a partial circumference of the second rotary switch module 38 (not visible). In such case, the male annular ring of the second rotary switch module 38 is shorter in length than the female annular groove contained in the rotary switch support member 14. Interaction between this male annular ring and the female annular groove serves to lock the second rotary switch module 38 to the rotary switch support member 14 in order to prevent relative displacement of the second rotary switch module 38 with respect to the rotary switch support member 14 along the longitudinal axis 24. However, the male annular ring is shorter in length than the female annular groove, thereby allowing the second rotary switch module 38 to be rotated with respect to the rotary switch support member 14 through a fixed arcuate length. The length of the male annular ring on the interior surface of the second rotary switch module 38 therefore serves to provide a rotary stop for rotary motion of the switch module 38 by virtue of its interaction with the female annular groove. Other arrangements are nevertheless possible within the scope of the inventions.

The second rotary switch module 38 preferably includes a male detent 42 formed on an interior surface thereof and positioned to interact with a second set of female detents (not visible) on the rear side of the rotary switch support member 14 in a manner analogous to that described hereinabove with respect to the male detent 20/female detents, 22.

A sliding bridge contact 44 is located on the interior surface of the second rotary switch module 38, and is positioned to interact with a portion of the contacts 28 formed on the flexible printed circuit board 26. Rotation of the second rotary switch module 38 about the longitudinal axis 24 therefore causes electrical connection of various contacts on the flexible circuit board 26 by virtue of the wiping motion of the sliding bridge contacts 44 thereacross. The relative positioning between the second rotary switch module 38 and the rotary switch support member 14 is controlled by interaction between the male detent 42 and the female detents (not shown), as well as by interaction between the male annular ring formed on the interior surface of the switch module 38 and the female annular groove formed into the rotary switch support member 14. As can be seen with reference to the above description, the first and second rotary switch modules may be operated independently and even simultaneously in order to control circuits coupled to the appropriate contacts on the flexible circuit board 26. This feature, when employed, places a great deal of control functionality at the proximal end of the stalk switch 10, where the controls may be conveniently manipulated by the operator of the motor vehicle without removing his or her eyes from the road.

Once the first, rotary switch module 12 and the second rotary switch module 38 are mounted to the rotary switch support member 14, the distal end of the rotary switch support member 14 remains exposed. This distal end is mounted to a stationary handle 46. In order to accomplish this mounting, the rotary switch support member 14 includes an annular rib 48 formed partially around the circumference thereof and interrupted by two slots 50 running parallel to the longitudinal aids 24. An annular groove (not shown) formed on an interior surface of the stationary handle 46 accepts the annular rib 48 in order to lock the rotary switch support member 14 to the stationary handle 46. A single rib (not shown) on the interior surface of the stationary handle 46 and running parallel to the longitudinal axis 24 locates into one of the slots 50 of the support member 14 in order to assure proper orientation with the stationary handle 46 and to serve as a locking device (key) to prevent the rotary switch support member 14 from rotating with respect to the stationary handle 46. The second slot 50 in the rotary switch support member 14 diametrically opposite the key slot 50 permits flexing of the support member 14 during assembly.

Once the first and second rotary switch modules are mounted to the rotary switch support member and once the rotary switch support member is mounted to the stationary handle, this assembly gives the appearance of a unitary structure having multiple switching capabilities. In order to extend this assembly out from the motor vehicle steering column to a position where it is readily accessible by the operator of the motor vehicle, the stationary handle 46 is coupled to an elongated handle stalk 52, which is preferably formed from a hollow metal tube for strength. A circumferential series of serrations 54 facilitate forming a press-fit connection between the stationary handle 46 and the handle stalk 52. In order to key the orientation of the stationary handle 46 to the handle stalk 52, the interior surface of the stationary handle 46 includes a rib 56 extending parallel to the longitudinal aids 24, while the handle stalk 52 includes a single groove (not shown) sized for mating with the rib 56. This ensures that the stationary handle 46 may only be mounted to the handle stalk 52 in one orientation.

Figure 8:
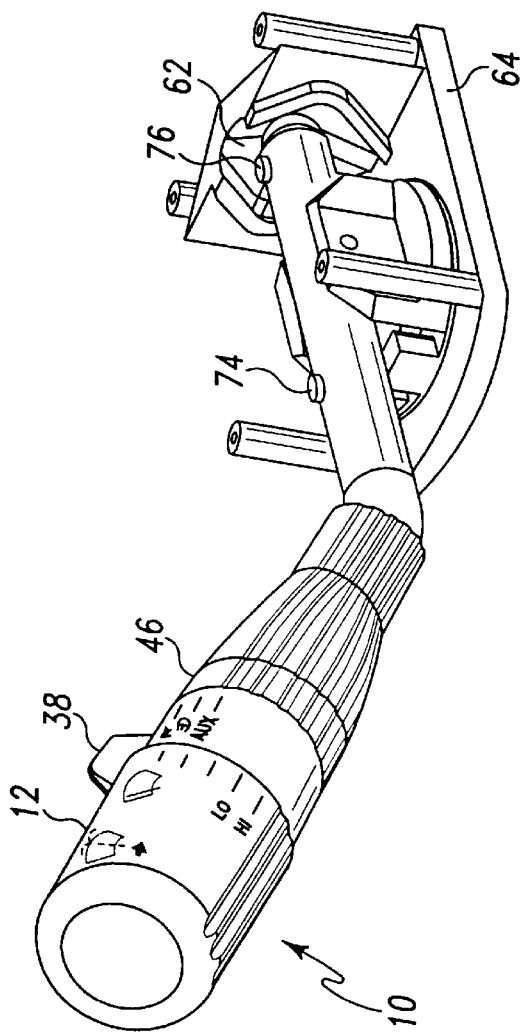
FIG. 8 is a perspective view of the preferred embodiment of the present invention without the circuit board of FIGS. 7A–C mounted thereon.

A detent is formed at the distal end of the handle stalk 52 by means of a plunger 58 and biasing spring 60. As best seen in FIGS. 5, 6, and 8, the spring-loaded plunger 58 rests in a concave centering mechanism 62 that is formed as part of a rotational receptacle 64. The rotational receptacle 64 allows the multi-function stalk switch 10 to be mounted to a steering column of the motor vehicle while still allowing the stalk switch 10 to be moved in two orthogonal planes. Such movement is accomplished by mounting the stalk switch 10 to the rotational receptacle 64 by means of a pivot pin 66 that extends through the handle stalk 52. The pivot pin 66 in turn mounts to a rotation assembly 68 which is rotatably coupled to the rotational receptacle 64 by means of a second pivot pin 70. The first-pivot pin 66 allows the multi-function stalk switch 10 to be pivoted in a first plane, while the second pivot pin 70 allows the stalk switch 10 to be pivoted in a second plane which preferably (but not necessarily) is orthogonal to the first plane. Pivoting in either plane causes the spring-loaded plunger 58 to be compressed as it is moved away from the central position of the concave centering mechanism 62. The force exerted by the compressed biasing spring 60 will automatically return the stalk switch 10 to its central (neutral) position by forcing the plunger 58 to the central portion of the concave centering mechanism 62 once external forces on the stalk switch 10 have been removed. In this manner, the stalk switch 10 is self-centering. Additionally, the walls 72 of the rotational receptacle 64 serve as physical stops for pivoting motion of the stalk switch 10 in either direction in both planes.

A pair of magnets 74 and 76 are mounted to the handle stalk 52 on either side of the first pivot pin 66. The relative position of these magnets 74, 76 are sensed by an array of Hall effect sensor ICs positioned on a circuit board 78 mounted to the rotational receptacle 64. The stalk switch 10 is shown with the circuit board 78 removed in FIG. 8, and is illustrated with the circuit board 78 attached thereto in FIGS. 10 and 11.

Figure 7C:
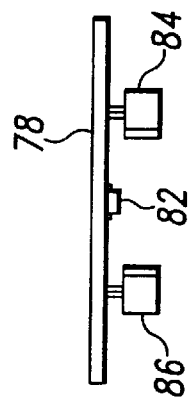
FIGS. 7A–C are a plan view, side elevational view, and an end elevational view, respectively, of a Hall effect sensor mounting circuit board of the preferred embodiment of the present invention.
Figure 7B:
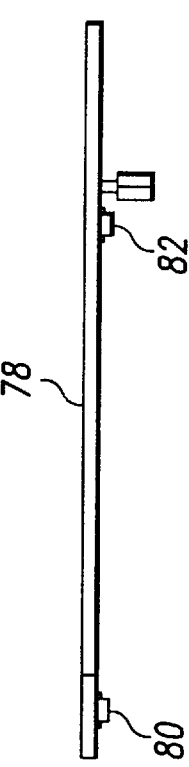
Figure 7A:
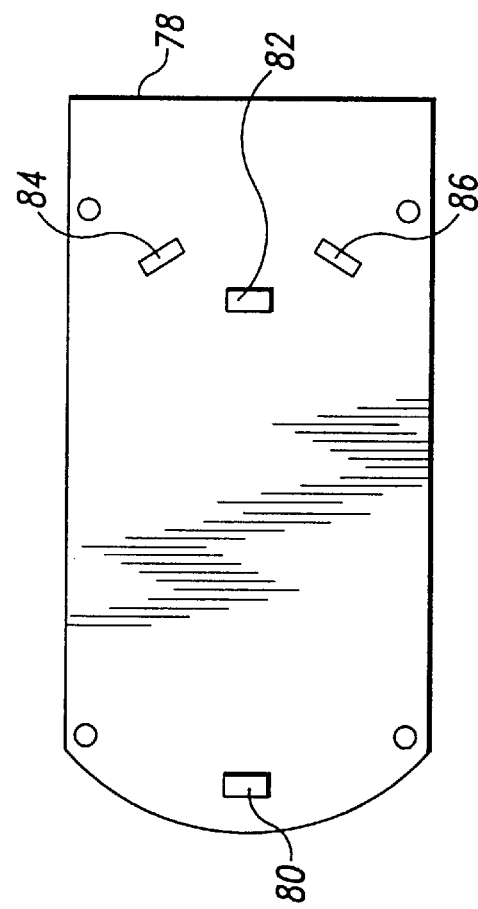

The circuit board 78 is illustrated in three views in FIGS. 7A–C. The circuit board 78 includes two pairs of Hall effect ICs 80–86. Each of the Hall effect ICs is capable of sensing the magnetic field emitted by a magnet, such as the magnets 74, 76, when that magnetic field is brought into close proximity to the Hall effect IC.

When the plunger 58 is centered within the concave centering mechanism 62, the magnets 74, 76 are too far away from the Hall effect ICs 80–86 for any of these Hall effect ICs 80–86 to sense the magnetic field emitted by either magnet. As the stalk switch 10 is moved in either of its planes of motion, one of the magnets "14, 76 will be brought into close proximity with one of the Hall effect ICs 80–86, thereby allowing a controller coupled to the stalk switch 10 to determine what position the stalk switch 10 has been placed in with respect to the rotational receptacle 64. For example, FIG. 5 illustrates the stalk switch 10 in a neutral position, in which the magnets 74, 76 are too far away from any of the Hall effect ICs 80–86 to be sensed thereby. In the preferred embodiment of the present invention, pivoting of the stalk switch 10 about the first pivot pin 66 may be used to activate the headlight dimming and "flash-to-pass" function or the courtesy marker lamp flash function, depending upon the direction of rotation of the stalk switch 10 about the first pivot pin 66. As illustrated in FIG. 6, when the stalk switch 10 is moved in a first direction about the pivot pin 66, the magnet 76 is brought into close proximity with the Hall effect sensor IC 82. At this proximity, the Hall effect sensor IC 82 is able to sense the magnetic field of the magnet 76, and will therefore produce an output which is indicative of this position of the stalk switch 10. Similarly, rotation of the stalk switch 10 in the opposite direction about the first pivot pin 66 will bring the magnet 74 into close proximity with the Hall effect IC 80, thereby indicating rotation of the stalk switch 10 in the opposite direction.

In an analogous fashion, rotation of the stalk switch 10 in the second plane about the second pivot pin 70 will cause the magnet 76 to be brought into close proximity with either the Hall effect sensor IC 84 or the Hall effect sensor IC 86, depending upon the direction of rotation of the stalk switch 10. It will thus be appreciated that movement of the stalk switch 10 in either of the orthogonal planes may be sensed by interaction between the appropriate magnet 74, 76 and the appropriate Hall effect sensor IC 80–86.

From the above description, it will be appreciated that the multi-function stalk switch 10 of the present invention incorporates a pushbutton switch, a first rotary switch, and a second rotary switch onto a single stalk handle, wherein the stalk itself may be rotated in two orthogonal planes in order to accomplish four other switching functions. All of this can be accomplished with a low parts count, a simplified assembly procedure, low cost, and high reliability.

Figure 14:
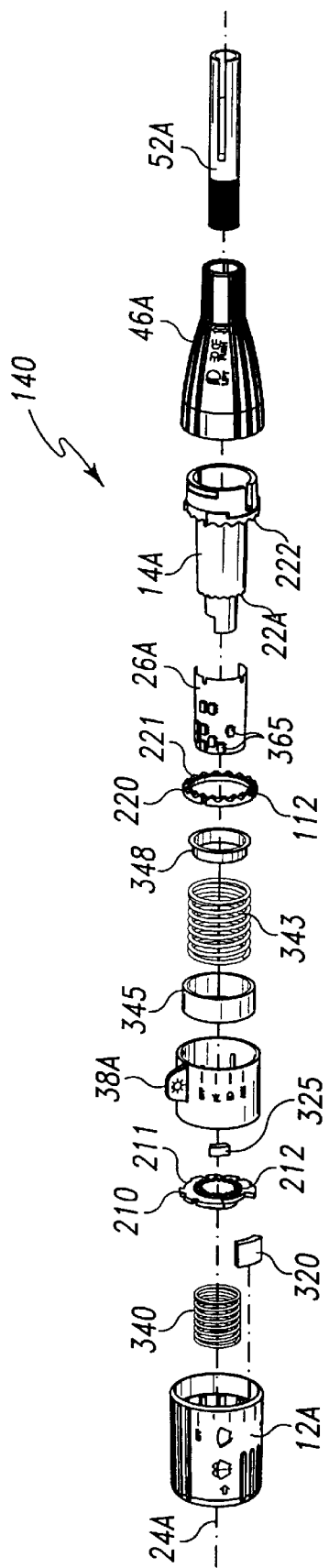
FIG. 14 is an exploded perspective view of certain elements of an alternative embodiment multi-function stalk switch.
Figure 15B:
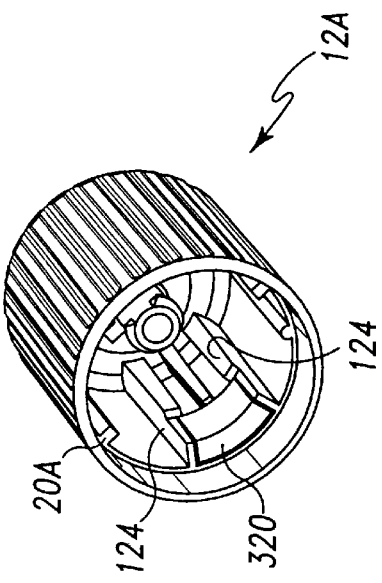
FIG. 15 is perspective view of an alternative first and second rotary switch module suitable for use in the multi-function stalk switch of FIG. 14.
Figure 15D:
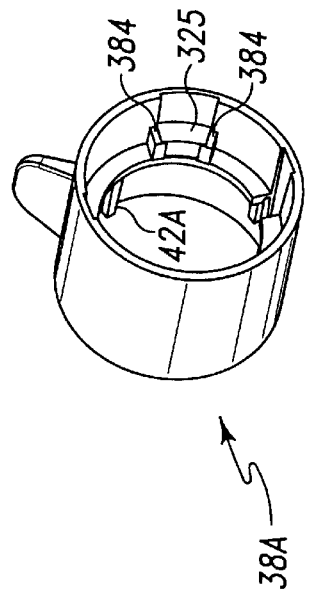
Figure 15A:
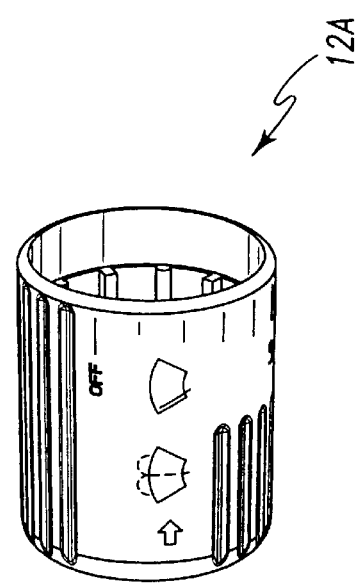
Figure 15C:
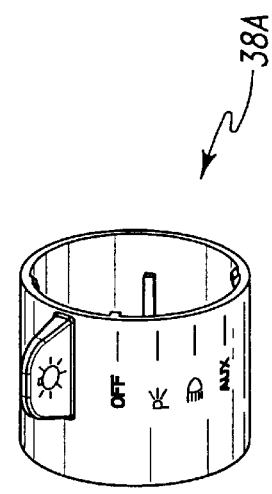
Figure 16:
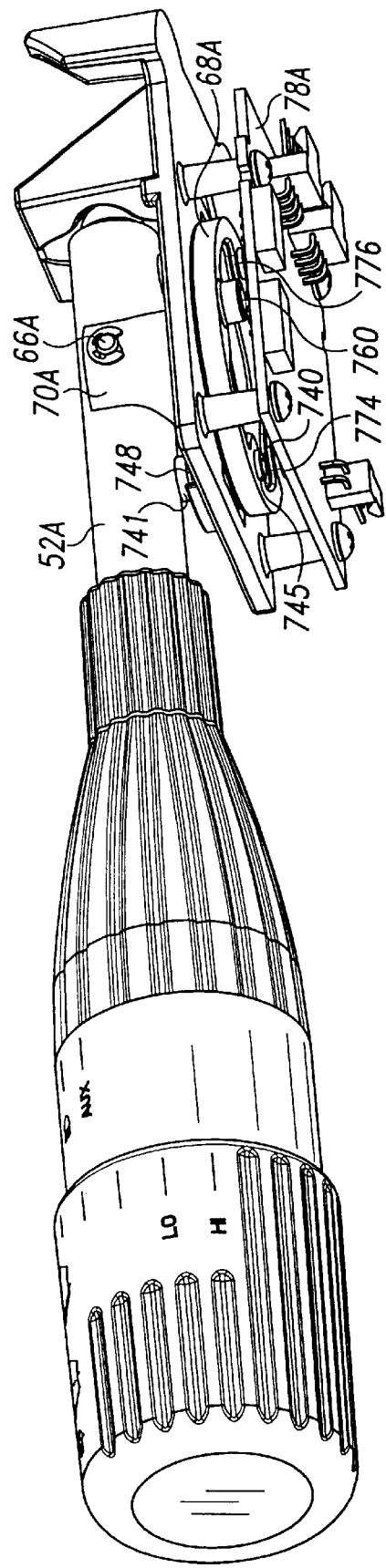
FIG. 16 is a perspective view of the multi-function stalk switch of FIG. 14.

FIGS. 14–16 illustrates the features of certain alternative embodiments of a stalk switch according to the present invention, shown generally as 140 in FIG. 14. In FIGS. 14–16, analogous elements to those shown in FIGS. 1–13 are designated with similar numbers, plus the suffix "A." For example, the first rotary switch module in these alternative embodiments is designated 12A.

In certain of these alternative embodiments the spring 34A is omitted, the series of female detents 22A is perpendicular to the longitudinal axis 24A of the stalk switch 140 and is radially symmetric about it, and a second spring 340 and a first detent washer 210 are placed inside the first rotary switch module 12A, with the second spring 340 positioned between the first rotary switch module 12A and the first detent washer 210 such that the first detent washer 210 is biased away from the rotary switch module 12A. The first detent washer 210 preferably has a first non-circular outer perimeter 211 shaped to mate with the first rotary switch module 12A, including the male detent 20A, thereby fixing the angular positions of the first detent washer 210 and the first rotary switch module 12A with respect to each other. The first detent washer 210 has a series of small male detents 212 on its distal surface shaped to mate with the series of female detents 22A. When the stalk switch 140 is assembled, the second spring 340 biases the first detent washer 210 and the rotary switch support member 14A together, with the series of small male detents 212 and the series of female detents 22A interfacing, so as to create a counter-torque against any torque applied to the first rotary switch module 12A. The magnitude of the counter-torque is limited by the strength of the second spring 340, and by the shape of the series of small male detents 212 and the series of female detents 22A, so that when sufficient torque is applied to the first rotary switch module 12A, the second spring 340 will compress in order to allow the detents 212 and 22A to slip relative to one another, permitting the first rotary switch module 12A to rotate. When the torque applied is sufficiently reduced, the first rotary switch module 12A will come to rest at one of a finite number of angular positions relative to the rotary switch support member 14A, defined by the series of female detents 22A and the series of small male detents 212.

In certain alternative embodiments, a second detent washer 220 and a third spring 343 are mounted between the second rotary switch module 38A and the rotary switch support member 14A, with the third spring 343 positioned on the proximal side of the second detent washer 220. The second detent washer 220 preferably has a second non-circular outer perimeter 112, shaped to interface with the interior of the second rotary switch module 38A, including male detent 42A, such that the second detent washer 220 has a fixed angular position relative to the second rotary switch module 38A. Preferably, a centralizing ring 348 is also positioned on the proximal side of the second detent washer 220, inside the third spring 343, and a cylindrical spring guide 345 is preferably disposed around the third spring 345, in order to prevent the third spring 343 from binding. In certain of these embodiments, the second detent washer 220 has a series of large male detents 221 on the distal surface, and the rotary switch support member 14A has a corresponding series of large female detents 222 positioned to mate with the series of large male detents 221, and to be biased together by the third spring 343 when the stalk switch 140 is assembled. The third spring 343, second detent washer 220, and series of large female detents 222 provide a limited counter-torque to torque applied to the second rotary switch module 38A and cause the second rotary switch module 38A to come to rest at one of a finite number of angular positions relative to the rotary switch support member 14 when the torque applied is reduced below the limit on the counter-torque, analogously the effects on the first rotary switch module 12A produced by the second spring 340, first detent washer 220, and series of female detents 22A.

By using the first detent washer 210, second spring 340, second detent washer 220, and third spring 343 to control the rotary movement of the first rotary switch module 12A and second rotary switch module 38A, wear from the interaction of detents is reduced, so that the stalk switch 140 performs more consistently throughout its life.

In certain alternative embodiments, the flexible printed circuit board 26A lacks the spaced-apart contacts 28A, and has a plurality of Hall Effect sensors 365. In these embodiments, the first metallic bridge contact 32A in the first rotary switch module 12A is likewise replaced with a first magnet 320, positioned to pass outside the printed circuit board 26A, rather than to wipe across it, when the first rotary switch module 12A moves relative to the rotary switch support member 14A. Similarly, the second metallic bridge contact 36A is replaced with a second magnet 325. The Hall Effect sensors are positioned to detect both rotary movement of the first and second rotary switch modules 12A and 38A, and longitudinal movement of the first rotary switch module 12A, analogously to the first and second metallic bridge contacts 32A and 36A and the spaced-apart contacts 28A. By replacing the spaced-apart contacts 28A with Hall Effect sensors, the reliability of the printed circuit board 26A is improved due to the elimination of the wiping contacts.

FIGS. 15A–D illustrate additional details of the first rotary switch module 12A and the second rotary switch module 38A shown in FIG. 14. In particular, in FIG. 15B the interior of the first rotary switch module 12A can be seen, including the male detent 20A, and pair of first flanges 124 adapted to hold the first magnet 320 in place. Likewise, FIG. 15D shows the interior of the second rotary switch module 38A, including the male detent 42A, and a pair of second flanges 384 adapted to hold the second magnet 325 in place.

FIG. 16 illustrates certain features of certain alternative embodiments of a stalk switch 140 according to the present invention. In certain alternative embodiments, the pair of magnets 74 and 76 are replaced with a proximal third magnet 774 and a distal third magnet 776, respectively, contained in a pair of plastic plungers 740, having enlarged heads 741, which are positioned in a pair of holes 745 in the rotation assembly 68A, preferably away from its axis of rotation, with their heads 741 contacting the elongated handle stalk 52A. A fourth spring 748 is preferably placed around the body of each of the plungers 740 and between the heads 741 and the rotation assembly 68A, so that the heads 741 are biased away from the, rotation assembly 68A. Rotation assembly 68A also contains a fourth magnet 760, preferably positioned far from it's axis of rotation and about half-way between the pair of magnets 774 and 776 along the perimeter of the rotation assembly 68A. and about half-way between the pair of magnets 774 and 776 along the perimeter of the rotation assembly 68A.

In these embodiments, the circuit board 78A is positioned opposite the rotation assembly 68 from the elongated handle stalk 52A, and the two pairs of Hall effect ICs 80–86 are repositioned to detect motion of the third magnets 774 and 776 and the fourth magnet 760 caused when the elongated handle stalk 52A rotates about the pivot pin 66A, the second pivot pin 70A, or both. When the elongated handle stalk 52A rotates about the pivot pin 66A, one of the plungers 740 is pushed against the bias of one of the fourth springs 748, towards the circuit board 78A, bringing it close enough to be detected by one of the Hall effect sensors comprising the two pairs of Hall effect IC's 80–86. Likewise, when the elongated handle stalk 52A rotates about the second pivot pin 70A, the third magnet rotates with the rotation assembly 68A, bringing it close enough to one of the Hall effect sensors comprising the two pairs of Hall effect IC's 80–86 to be detected.

The assemblies of plastic plungers 740 and fourth springs 748 is more reliable than affixing the pair of magnets 774 and 776 directly to the elongated handle stalk 52A, and is more cost effective to assemble.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A multi-function stalk switch comprising:
    a second rotary switch module having a third surface;
    wherein the rotary switch support member also has a fourth surface;
    at least one second detent formed on one of said third and fourth surfaces;
    a second detent washer shaped to engage said at least one second detent, and having an angular position fixed relative to one of the second rotary switch module and the rotary switch support member;
    a second spring positioned to bias said second detent washer against said at least one second detent.

2. The multi-function stalk switch of claim 1, further comprising:
    a flexible circuit board in contact with and substantially conforming to at least a portion of said second surface, said flexible circuit board having a first plurality of first magnetic field sensors;
    a first magnet coupled to said first rotary switch module;
    a second magnet coupled to said second rotary switch module;
    wherein said first magnet is positioned to be detected by at least one of said plurality of magnetic field sensors when said first rotary switch module is at a first position with respect to said rotary switch support member; and
    wherein said second magnet is positioned to be detected by at least one of said plurality of magnetic field sensors when said first rotary switch module is at a second position with respect to said rotary switch support member.

3. The multi-function stalk switch of claim 2, further comprising:
    a handle stalk having a proximal end and a distal end, said proximal end being operatively coupled to said rotary switch support member;
    a plunger coupled to said stalk distal end such that said plunger may move linearly with respect to said stalk distal end, said plunger being biased in said distal direction;
    a rotational receptacle coupled to said handle stalk such that said handle stalk may pivot in at least one plane; and
    a concave centering mechanism having a concave surface and coupled to said rotational receptacle such that said plunger is in contact with said concave surface;
    wherein a pivoting force applied to the handle stalk causes said plunger to be displaced along said concave surface, thereby compressing said plunger away from said distal end; and
    wherein removal of said pivoting force allows distal linear movement of said plunger in response to said plunger bias, thereby forcing said plunger to a center of said concave surface.

4. The multi-function stalk switch of claim 3, further comprising:
    a rotation assembly coupled to said handle stalk by means of a first pivot pin extending therethrough; and
    a second pivot pin coupling said rotation assembly to said rotational receptacle;
    wherein said first pivot pin allows said handle stalk to rotate in a first plane with respect to said rotational receptacle; and
    wherein said second pivot pin allows said handle stalk to rotate in a second plane with respect to said rotational receptacle.

5. The multi-function stalk switch of claim 4, wherein the second plane is substantially orthogonal to the first plane.

6. The multi-function stalk switch of claim 4, further comprising:
- at least one third magnet coupled to said handle stalk; and
- at least one second magnetic field sensor;
- wherein at least one magnetic field sensor is positioned to sense movement of said at least one third magnet when said handle stalk is rotated in at least one of said first and second planes.

7. The multi-function stalk switch of claim 6, wherein said at least one third magnet comprises a proximal third magnet coupled to said handle stalk proximal of said first pivot pin and a distal third magnet coupled to said handle stalk distal to said first pivot pin; and
- wherein said at least one second magnetic field sensor comprises at least one second magnetic field sensor for sensing rotation of said handle stalk about said first pivot pin, and at least one third magnetic field sensor for sensing rotation of said handle stalk about said second pivot pin.

8. The multi-function stalk switch of claim 7, wherein said at least one second and at least one third magnetic field sensors comprise Hall Effect sensors.

9. The multi-function stalk switch of claim 7, further comprising:
- first and second plungers having respective first and second enlarged heads;
- at least one fourth spring;
- a first hole and a second hole formed in said rotation assembly;
- wherein said proximal third magnet is positioned in said first plunger and said distal third magnet is positioned in said second plunger; and
- wherein said first plunger is positioned within said first hole and said second plunger is positioned within said second hole; and
- wherein one of said at least one fourth springs is positioned around each of said first and second plungers between each of said enlarged heads and said rotation assembly, thereby biasing said first plunger away from said rotation assembly.

10. A multi-function switch, comprising:
- a first rotary switch module having a first surface;
- a first magnet coupled to said first rotary switch module;
- a second rotary switch module having a third surface;
- a second magnet coupled to said second rotary switch module;
- a rotary switch support member having a second surface and a fourth surface;
- at least one first detent formed on one of said first and second surfaces;
- at least one second detent formed on one of said third and fourth surfaces;
- a first detent washer shaped to engage said at least one first detent, and having an angular position fixed relative to one of the first rotary switch module and the rotary switch support member;
- a second detent washer shaped to engage said at least one second detent, and having an angular position fixed relative to one of the second rotary switch module and the rotary switch support member;
- a first spring positioned to bias said first detent washer against said at least one first detent and a second spring positioned to bias said second detent washer against said at least one second detent;
- a flexible circuit board in contact with and substantially conforming to at least a portion of said second surface, said flexible circuit board having a first plurality of first magnetic field sensors;
- wherein said first magnet is positioned to be detected by at least one of said plurality of magnetic field sensors when said first rotary switch module is at a first position with respect to said rotary switch support member; and
- wherein said second magnet is positioned to be detected by at least one of said plurality of magnetic field sensors when said first rotary switch module is at a second position with respect to said rotary switch support member;
- a handle stalk having a proximal end and a distal end, said proximal end being operatively coupled to said rotary switch support member, and said distal end having a plunger coupled thereto such that said plunger may move linearly with respect to said stalk distal end, said plunger being biased in said distal direction;
- a rotation assembly coupled to said handle stalk by means of a first pivot pin extending therethrough, such that said handle stalk can rotate in a first plane, and by a second pivot pin, such that said handle stalk can rotate in a second plane, said second plane being substantially perpendicular to said first plane;
- a rotational receptacle coupled to said rotation assembly and having a first hole and a second hole;
- a concave centering mechanism having a concave surface and coupled to said rotational receptacle such that said plunger is in contact with said concave surface;
- wherein a pivoting force applied to the handle stalk causes said plunger to be displaced along said concave surface, thereby compressing said plunger away from said distal end;
- wherein removal of said pivoting force allows distal linear movement of said plunger in response to said plunger bias, thereby forcing said plunger to a center of said concave surface;
- first and second plungers having respective first and second enlarged heads and being positioned substantially within said first hole and said second hole, respectively;
- a proximal third magnet substantially positioned within said first plunger and coupled to said handle stalk proximal of said first pivot pin;
- a distal third magnet coupled to said handle stalk distal to said first pivot pin positioned substantially within said second plunger;
- a fourth spring positioned around each of said first and second plungers between each of said enlarged heads and said rotation assembly, thereby biasing said first plunger away from said rotation assembly;
- at least one second Hall effect sensor for sensing motion of said third magnets caused by rotation of said handle stalk about said first pivot pin;
- at least one third Hall effect sensor for sensing rotation of said handle stalk about said second pivot pin.

* * * * *

UNITED STATES PATENT AND TRADEMARK OFFICE
CERTIFICATE OF CORRECTION

PATENT NO.         : 6,518,524 B1
APPLICATION NO. : 09/714367
DATED                  : February 11, 2003
INVENTOR(S)        : Brandt et al.

It is certified that error appears in the above-identified patent and that said Letters Patent is hereby corrected as shown below:

In column 11, line 66 through column 12, line 10, please change

"1. A multi-function stalk switch comprising:

a second rotary switch module having a third surface;

wherein the rotary switch support member also has a fourth surface;

at least one second detent formed on one of said third and fourth surfaces;

a second detent washer shaped to engage said at least one second detent, and having an angular position fixed relative to one of the second rotary switch module and the rotary switch support member;

a second spring positioned to bias said second detent washer against said at least one second detent." to --1. A multi-function stalk switch comprising:

a first rotary switch module having a first surface;

a rotary switch support member having a second surface;

at least one first detent formed on one of said first and second surfaces;

a first detent washer shaped to engage said at least one first detent, and having an angular position fixed relative to one of the first rotary switch module and the rotary switch support member;

a first spring positioned to bias said first detent washer against said at least one first detent;

a second rotary switch module having a third surface;

UNITED STATES PATENT AND TRADEMARK OFFICE
CERTIFICATE OF CORRECTION

PATENT NO. : 6,518,524 B1
APPLICATION NO. : 09/714367
DATED : February 11, 2003
INVENTOR(S) : Brandt et al.

Page 2 of 2

It is certified that error appears in the above-identified patent and that said Letters Patent is hereby corrected as shown below:

wherein the rotary switch support member also has a fourth surface;

at least one second detent formed on one of said third and fourth surfaces;

a second detent washer shaped to engage said at least one second detent, and having an angular position fixed relative to one of the second rotary switch module and the rotary switch support member;

a second spring positioned to bias said second detent washer against said at least one second detent.--

Signed and Sealed this

Twenty-second Day of January, 2008

JON W. DUDAS
*Director of the United States Patent and Trademark Office*